(12) United States Patent
Mehl

(10) Patent No.: US 9,409,799 B2
(45) Date of Patent: Aug. 9, 2016

(54) GRAVITY FLOW RUNOFF WATER PURIFICATION SYSTEM

(71) Applicant: Ronald Charles Mehl, Cartersville, GA (US)

(72) Inventor: Ronald Charles Mehl, Cartersville, GA (US)

(*) Notice: Subject to any disclaimer, the term of this patent is extended or adjusted under 35 U.S.C. 154(b) by 0 days.

(21) Appl. No.: 14/712,484

(22) Filed: May 14, 2015

(65) Prior Publication Data

US 2015/0329383 A1    Nov. 19, 2015

Related U.S. Application Data

(60) Provisional application No. 61/993,642, filed on May 15, 2014.

(51) Int. Cl.
| | | |
|---|---|---|
| *C02F 1/32* | (2006.01) | |
| *B01J 19/10* | (2006.01) | |
| *C02F 1/463* | (2006.01) | |
| *C02F 1/78* | (2006.01) | |
| *C02F 103/00* | (2006.01) | |

(52) U.S. Cl.
CPC . *C02F 1/463* (2013.01); *C02F 1/32* (2013.01); *C02F 1/78* (2013.01); *C02F 2103/001* (2013.01); *C02F 2201/4612* (2013.01); *C02F 2303/04* (2013.01); *C02F 2303/24* (2013.01)

(58) Field of Classification Search
CPC .............. C02F 1/463; C02F 1/32; C02F 1/78; C02F 2103/001; C02F 1/46114; C02F 2001/46128; C02F 2001/46133; C02F 2201/004; C02F 2201/006; C02F 2201/4611; C02F 2209/30; C02F 2001/46157; C25B 9/166; H01L 21/2885; B01J 19/10; B01J 19/22

See application file for complete search history.

(56) References Cited

U.S. PATENT DOCUMENTS

| | | | | |
|---|---|---|---|---|
| 6,139,704 A | * | 10/2000 | de Nora | C04B 41/009 204/244 |
| 2012/0048741 A1 | * | 3/2012 | Stewart | C02F 1/4674 205/337 |

* cited by examiner

*Primary Examiner* — Walter D Griffin
*Assistant Examiner* — Cameron J Allen
(74) *Attorney, Agent, or Firm* — Dunlap Bennett & Ludwig PLLC

(57) ABSTRACT

A gravity flow runoff water purification system is provided. The gravity flow runoff water purification system of the present invention includes a debris filter, a grit chamber, and a linear electrolytic reactor. The linear electrolytic reactor includes a plurality of cell chambers separated by at least one fixed electrode plate operable to receive a current. A bi-polar anode blend is disposed at the bottom of each chamber and is charged by the at least one electrode plate using a VLF AC current in order to prevent plating over of fixed electrodes. The blend includes a conductive and consumable metal fraction, a conductive and non-consumable fraction, and a non-conductive pours spacer. Water runs through the debris filter, through the grit chamber and into the linear electrolytic reactor via gravity. The water flows through each of the cell chambers, thereby clarifying and purifying the water.

11 Claims, 4 Drawing Sheets

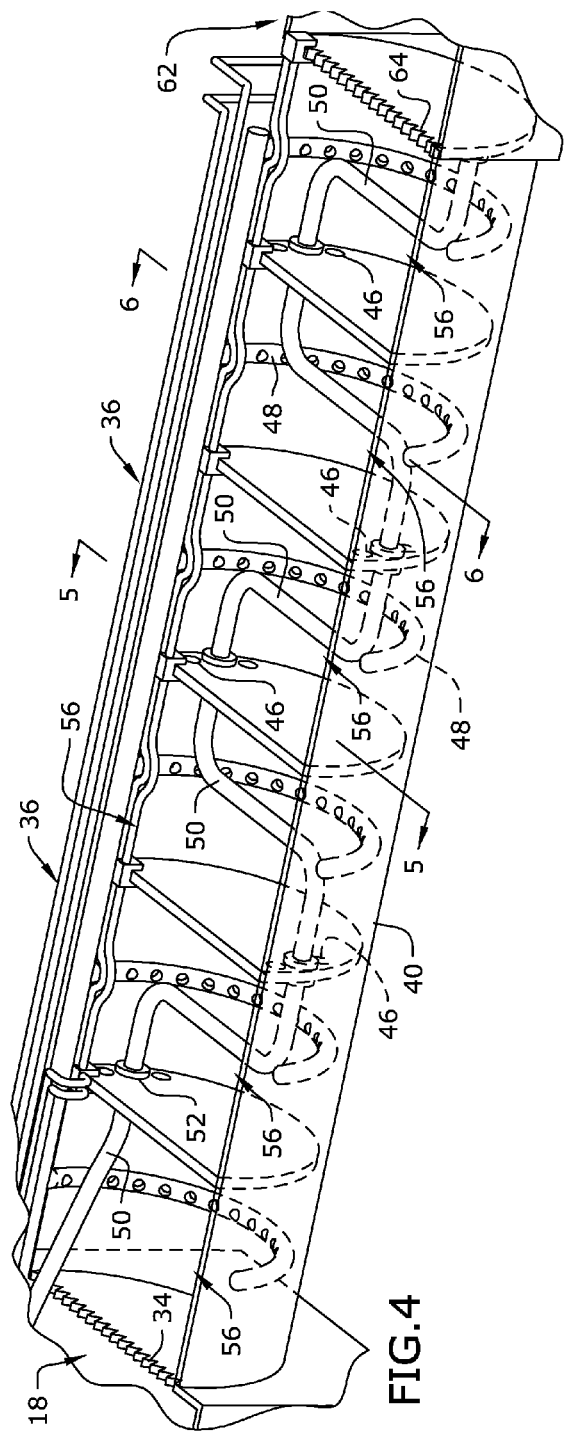
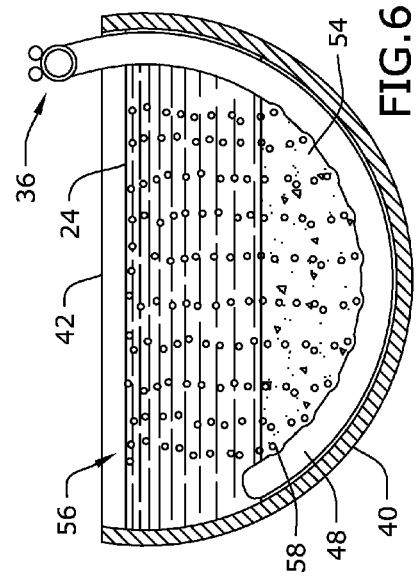
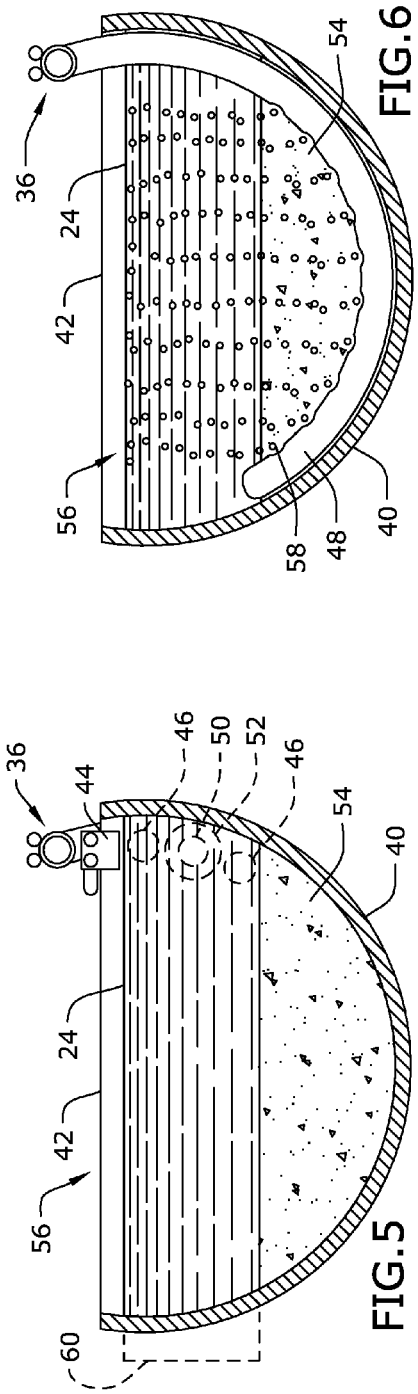

GRAVITY FLOW RUNOFF WATER PURIFICATION SYSTEM

CROSS-REFERENCE TO RELATED APPLICATION

This application claims the benefit of priority of U.S. provisional application No. 61/993,642, filed May 15, 2014, the contents of which are herein incorporated by reference.

BACKGROUND OF THE INVENTION

The present invention relates to filtering water and, more particularly, to an apparatus for killing bacteria and removing suspended solids in runoff water, using electrolytic processes in a gravity flow-through system.

Regulations require all runoff water from industrial plants to kill bacteria and remove hazardous waste products before the water leaves the facility grounds or enters the environment in any way. Existing treatment methods rely on capture, treat and release methods requiring pumps, valves and other restrictive devices in order to process water in a centralized location, using chemical processes to kill bacteria and remove solids. The method is expensive and time consuming and the delay in treatment allows the bacteria to grow, which increases the effectiveness and cost of treatment.

As can be seen, there is a need for an improved systems and method of killing bacteria and removing hazardous waste products from water.

SUMMARY OF THE INVENTION

In one aspect of the present invention, a gravity flow runoff water purification system comprises: a debris filter operable to separate sediment and debris from water; a linear electrolytic reactor fluidly connected to the debris filter, wherein the linear electrolytic reactor comprises: a plurality of cell chambers separated by at least one fixed electrode plate operable to receive a current; a bi-polar anode blend comprising a conductive and consumable metal fraction, a conductive and non-consumable fraction, and a non-conductive pours spacer, wherein the bi-polar anode blend is disposed within each of the plurality of cell chambers and is charged by the at least one electrode plate, wherein water is operable to run through the debris filter and into the linear electrolytic reactor, wherein the water flows through each of the cell chambers, thereby clarifying and purifying the water.

These and other features, aspects and advantages of the present invention will become better understood with reference to the following drawings, description and claims.

BRIEF DESCRIPTION OF THE DRAWINGS

FIG. 4 is a detail perspective view of an embodiment of the present invention;

FIG. 5 is a section detail view of the present invention along line 5-5 in FIG. 4 and shown in use;

FIG. 6 is a section detail view of the present invention along line 6-6 in FIG. 4 and shown in use;

DETAILED DESCRIPTION OF THE INVENTION

Figure 1:
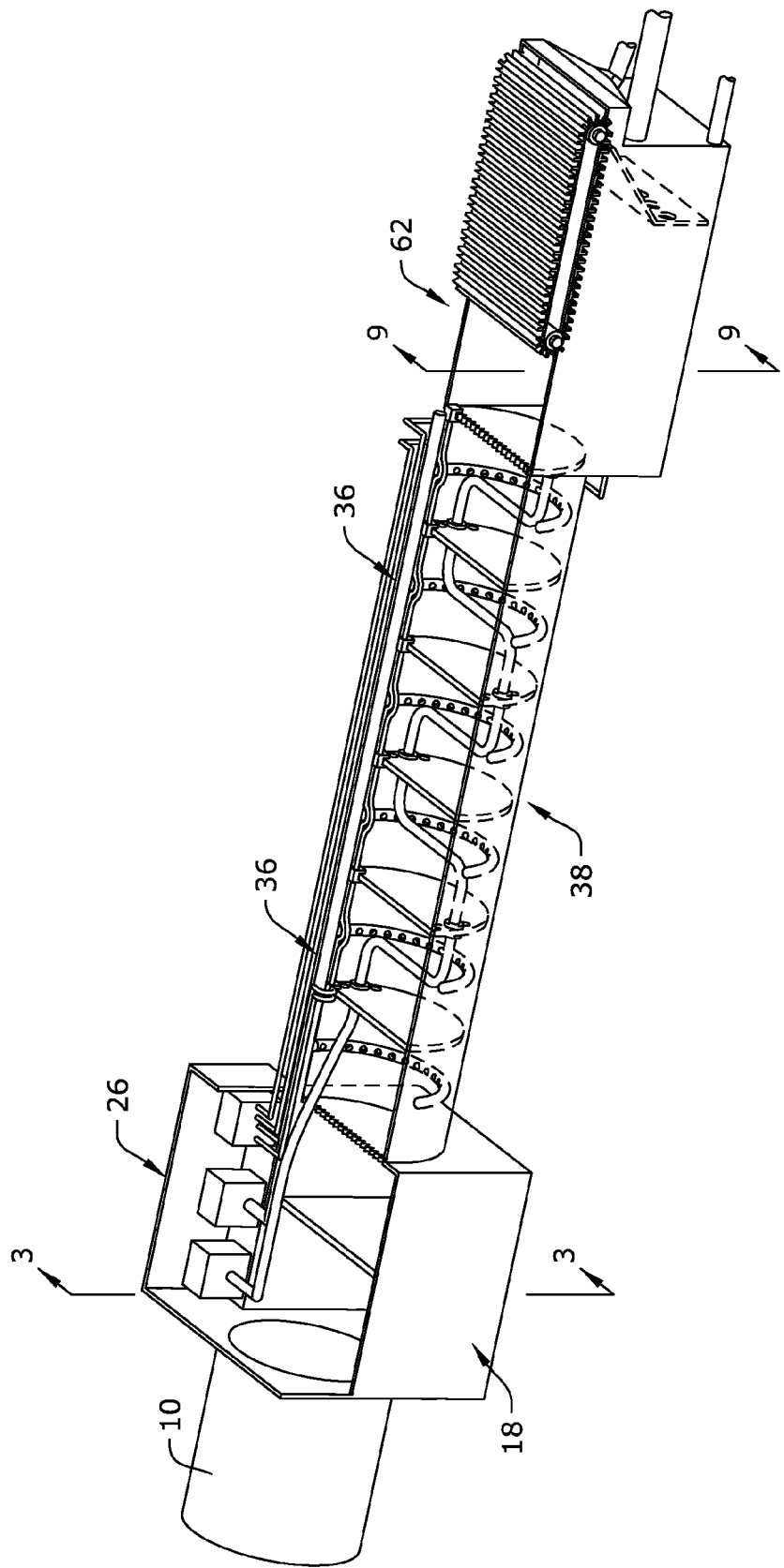
FIG. 1 is a perspective view of an embodiment of the present invention.
Figure 2:
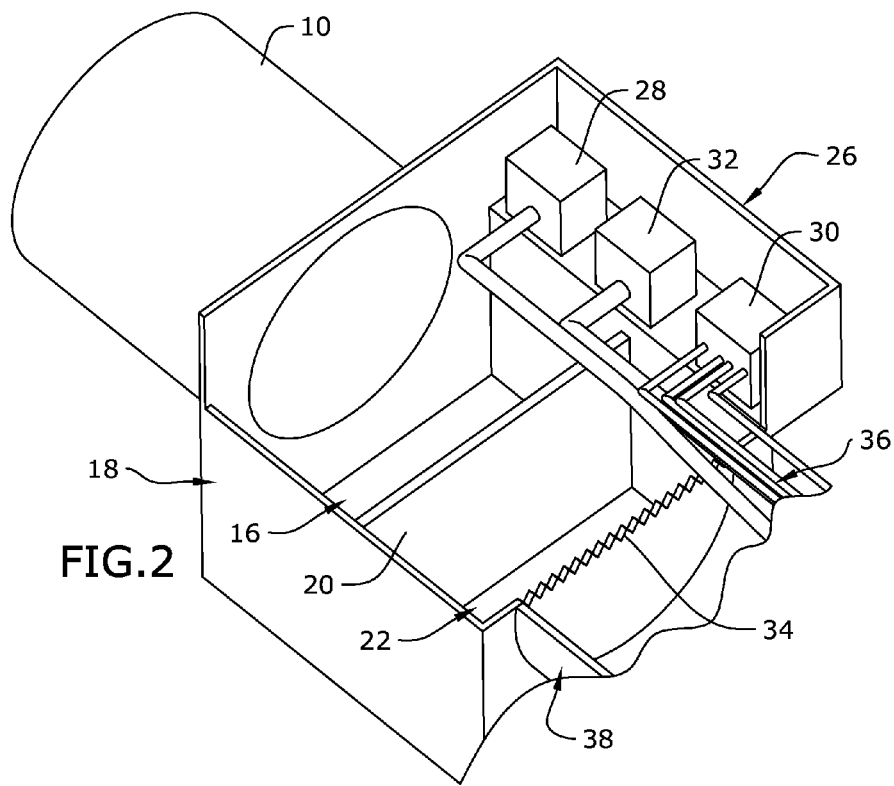
FIG. 2 is a detail perspective view of an embodiment of the present invention.
Figure 3:
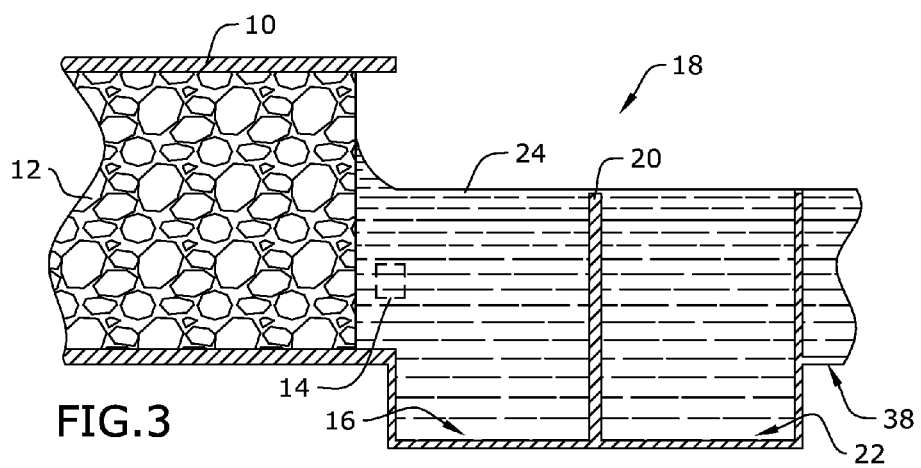
FIG. 3 is a section detail view of the present invention along line 3-3 in FIG. 1 and shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a system for killing bacteria and removing suspended solids in runoff water, using electrolytic processes in a gravity flow through system. The linear electrolytic reactor of the present invention treats the runoff water by killing bacteria using several oxidative processes including: Electrolytic Coagulation (EC), Electrolytic Oxidation Destruction (EOD) UV Sterilization and Ozone Injection. These processes or stages of treatment are contained in a culvert (pipe) so that treatment takes place in a gravity flow through system, as the runoff water leaves the property, eliminating the need for capture, treat and release methods, currently used. The present invention may be a standalone self contained treatment system that can be installed in remote areas. Further, the treatment of the present invention may be accomplished without chemical dosing.

In certain embodiments, the present invention starts treatment as soon as it senses the presence of water. The present invention treats that water as it passes through the system by gravity. The system kills bacteria before they have time to multiply and further eliminates any suspended solids that the bacteria may feed upon. The rapid treatment time (3 to 5 minutes) of the present invention saves equipment, water storage, housing facilities and energy associated with conventional methods.

Referring to FIGS. 1 through 9, the present invention includes a gravity flow water runoff filter. The gravity flow water runoff filter of the present invention includes a debris filter 12, a grit chamber 18, and a linear electrolytic reactor 38. The debris filter 12 is fluidly connected to the grit chamber 18, and the grit chamber 18 is fluidly connected to the linear electrolytic reactor 38. The linear electrolytic reactor 36 includes a plurality of cell chambers 56 separated by at least one fixed electrode plate 42 operable to receive a current. A bi-polar anode blend 54 is disposed at the bottom of each chamber 56 and is charged by the at least one electrode plate 42. The blend 54 includes a conductive and consumable metal fraction 88, a conductive and non-consumable fraction 92, and a non-conductive pours spacer 90. Water 24 runs through the debris filter 12, through the grit chamber 18 and into the linear electrolytic reactor 36 via gravity. The water 24 flows through each of the cell chamber 56, thereby filtering the water 24.

In certain embodiments, the debris filter 12 is a rock bed filter secured within a piping 10. Water 24 runs through rock bed filter 12 due to gravity. The rock bed filter prevents floating debris from entering the system. The present invention may further include a flow sensor 14. The flow sensor 14 senses running water 24 through the debris filter 12. When the flow sensor 14 senses water, the system is powered, and when the flow stops, the power is turned off.

The present invention may include a utility cabinet 26. The utility cabinet 26 may house the electrical devices of the present invention. As mentioned above, the electrical devices may be powered when the flow sensor senses water 24. The electrical housing may include an ultra violet light power supply 28, a current power supply 30, and an ozone generator 32 power supply. A trace 36 feeds power to the linear electrolytic reactor 38, and may be mounted on the side of the reactor 38.

As mentioned above, the grit chamber 18 is fluidly connected to the container 10. The grit chamber 18 may include a grit collection region 16 and untreated water region 22 separated by a baffle 20. The grit collection region 16 collects heavy particles, such as sand and grit. The sediment settles at the bottom of the chamber 18. Water 24 flows over the baffle 20 from the grit collection region 16 into untreated water region 22. The untreated water region 22 contains raw untreated water 24. The untreated water 24 may be pretreated by return of a small portion of the electrolytic processed water 24 from the reactor 38. The water 24 then flows over a weir 34 and enters the first cell chamber 56 of the reactor 38.

The plurality of independent cell chambers 56 are divided by fixed electrode plates 42 within a piping 40. Each cell chamber 56 in the reactor 38 acts independently to provide the stages of treatment including Electro-coagulation (EC), Electrolytic Oxidation Destruction (EOD), Ozone injection and UV Sterilization. Power is supplied to the fixed electrode plates 42 via power connectors 44. The power supply may include a Very Low Frequency (VLF) (0.1 Hz or lower) AC current at 24 v to 100 v. The frequency prevents the plating of a non-conductive film on the fixed electrode plates 16 which would eventually cause the system to fail. Each cell chamber 56 in the reactor 38 may act independently to provide the stages of treatment. Water continues to flow through the reactor 38 by gravity, in a serpentine manner, where each cell provides the treatment stages of Electro-coagulation (EC), Electrolytic Oxidation Destruction (EOD), Ozone Injection and UV Sterilization. These active components work together to kill bacteria and viruses in different ways as described.

Figure 7:
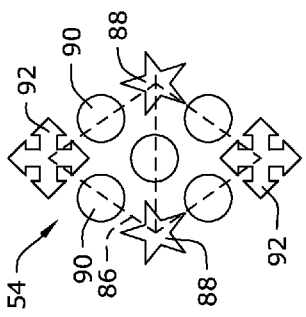
FIG. 7 is a schematic view of the anode blend.
Figure 8:
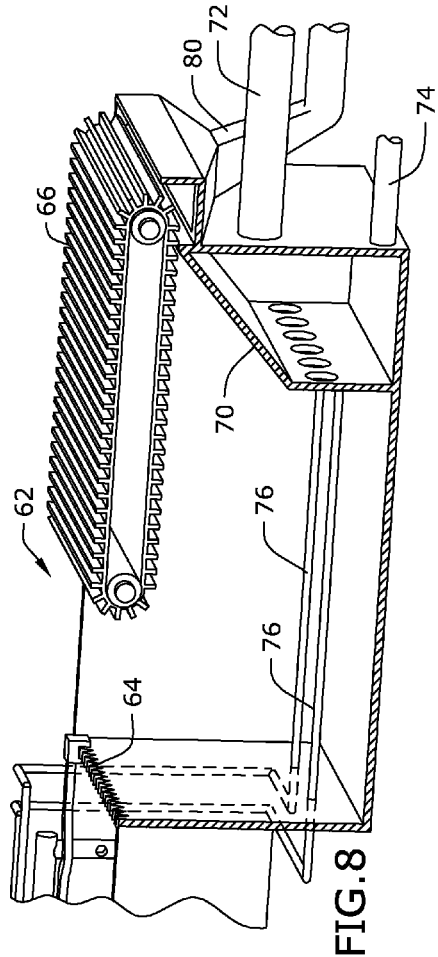
FIG. 8 is a detail perspective view of an embodiment of the present invention.
Figure 9:
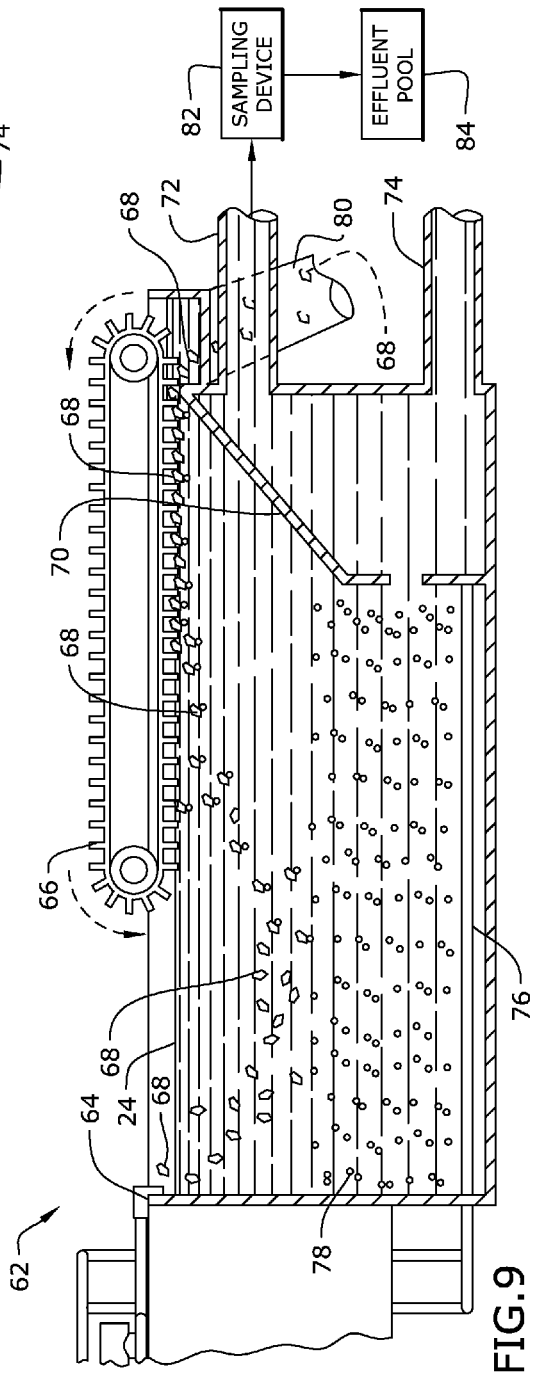
FIG. 9 is a section view of the present invention along line 9-9 in FIG. 1 and shown in use.

As mentioned above, the present invention includes a Bipolar anode blend 54 disposed at the bottom of each cell chamber 56. The conductive and consumable metal fraction 88 produces a Metal Hydroxide when energized. This Hydroxide forms a floc 68 causing the suspended solids to coagulate, separating the floc 68 from the clear water 24. The floc 68 that forms has a tendency to float due to the micro bubbles of Hydrogen and Oxygen that are generated during electrolysis, carrying the floc 68 to the surface of the cell chambers 56. The conductive and non-consumable fraction 92 produces hydrogen and oxygen when energized. The species of oxygen that have been identified are: Nascent Oxygen, Peroxide and Ozone, which accelerates the oxidation of organic compounds. The non-conductive pours spacer 90 helps to give some distance between the conductive pieces. FIG. 7 demonstrates the electron path 86 passing through the pour spacers 90. This feature increases the efficiency of the packed bed in production of both metal hydroxide and oxidative species. The fixed electrode dividers 42 are energized by the power supply to each of the fixed electrodes, supplying energy to the anode blend 54. This VLF AC current provides an even decomposition of the consumable fraction 88 of the Anode Blend 56. Low frequency allows time for anode decomposition but does not allow for plating of the fixed electrodes. An alternative power source may be used when DC current is required for the decomposition of some anode materials, such as Iron (Fe). In this case a High Frequency DC (HFDC) reversing polarity source would be used. The reversing in this case would be once every 1 to 5 seconds at a voltage range of 25 v to 100 v.

In certain embodiments, the present invention may include a plurality of ultra violet emitting lights disposed in between the bi-polar anode blend 54 and a top portion of the cell chamber 56. The ultra violet emitting lights may be secured within a light rope 50, which may follow a serpentine flow path through the chambers 56. The rope 50 may be secured by retainers 52 within the electrode plates 42. Flow apertures 46 may be formed above and below the retainers 52 so that water flows within an inch, such as within a quarter inch, of the UV rays from the light rope 50. The rope 50 may be secured at a center portion in between the blend 54 and the top surface of the water 24, and is thereby disposed in the clear water section 60 of the electrolytic bath where UV is most effective in killing bacteria. This maximizes the effect of UV rays to kill the bacteria.

The present invention may further include an ozone diffuser 48. Each of the cell chambers 56 may include an ozone diffuser 48. The diffuser 48 may be located beneath the bi-polar anode blend 54. As water 24 passes from cell chamber 56 to cell chamber 56, the water 24 it is subjected to ozone 58 by means of the diffuser 48. The ozone injection serves to purge the blend 54 periodically to loosen any sediment in the anode blend 54.

The present invention may further include an electrolytic dissolved air flotation separator (e-DAF). The electrolytic dissolved air flotation separator includes a separating chamber 62 that receives water 24 from the reactor 38 over a weir 64. Floc 68 formed within the water 24 floats into the chamber 62 with the water 24. An electrolytic micro bubble generator 76 is disposed at bottom of the separating chamber 62. Floc 68 already conditioned to float, are reintroduced to a second dose of micro bubbles 78. As the floc 68 begins to settle, these micro bubbles 78 of Hydrogen and Oxygen attach themselves to the falling floc 68 and carry the floc 68 to the surface. A conveyor 66, having a plurality of teeth, drags the floc 68 to a disposal end of the separating chamber 62 and into a hopper 80 for disposal. A baffle 70 may be suspended in a substantially vertical position within the chamber 62. The baffle 70 includes a plurality of ports therethrough, near a bottom of the chamber 62. The clear water 24 exits the e-DAF after traveling through the ports of the baffle 70. The ports prevent solids (floc) from exiting along with the clear water. The clarified, bacteria free, water exits through an effluent exit 72 and into an Automatic sample device 82 that takes and preserves a sample during the first 30-minutes of runoff in order to satisfy regulatory requirements. The sampling water 24 is then directed towards an effluent pool 84. Once the water 24 has been tested, the water flows out of a drain 74.

A method of making the present invention may include the following. A plastic pipe or culvert is cut in half horizontally to form the housing for the Linear Reactor. A Grit Chamber is attached at the front of the reactor housing. Fixed Electrodes are fitted into the reactor in order to divide the reactor into a series of individual electrolytic cells. Each cell contains the active components of EC, EOD, UV and Ozone. A utility cabinet houses the Power Supply, Ozone Generator and a UV Light Source, which is fed to each cell through a trace mounted on the sides of the reactor.

The utilities may be fitted to each cell in the following manner: Power to the Fixed Electrodes Cell Dividers, Ozone to Diffusers mounted in the bottom of the cell under the Anode Blend and UV by means of a LED Flexible Rope that is woven through the flow ports in each cell divider. Each cell is then filled with a Blend of Bipolar Anode pieces including: Conductive and Consumable metallic pieces, Conductive and Non-Consumable pieces and Non Conductive Pours spacer. A low profile, e-DAF separator is positioned after the reactor to remove the suspended solids by floatation. The e-DAF separator contains an electrolytic cell mounted horizontally at the bottom of the unit and a Conveyor mounted at the top of the device to remove the float (floc) from the surface. A sampling device is positioned at the effluent end of the e-DAF separator in order to catch a sample of the water as it leaves the separator.

Electrocoagulation (EC) by the oxygen ions produced in the reaction chamber oxidizes dyes, odors, bacteria, viruses, and biohazards. Electron flooding of the water eliminates the polar effect of the water complex, allowing colloidal materials to precipitate and the increase of electrons creates an osmotic pressure that ruptures bacteria, cysts, and viruses. The Electrolytic Oxidation Destruction process involves oxidizing organic compounds in an electro-chemical cell both directly at the surface of an electrode and indirectly by oxidizing chemicals in solution. The oxidative species produced by electrolysis include: Nascent Oxy, Ozone and Peroxide, these work together to accelerate the oxidation process. The Ozone comes into contact first with the cell wall of the bacteria. The cell wall is important to the bacteria as it maintains its shape. When ozone molecules come in contact with the cell wall, a reaction known as oxidative burst punctures the cell wall. This puncture injures the bacterium as it began to lose its shape. Ozone molecules continuous to puncture the cell walls and after a few seconds with a thousand collisions, the bacterial wall cannot anymore sustain the shape and so the cell dies. The Ultraviolet light (UV) kills microorganisms by damaging the DNA. UV radiation disrupts the chemical bonds that hold the atoms of DNA together in the microorganism. If the damage is severe enough, the bacteria cannot repair the damage and will die. Longer exposure to UV light is necessary to ensure complete kill-off of all microorganisms. This Invention includes a specially designed "LED UV Rope" that is woven through the ports of each fixed electrode divider. As the water passes through the retainers (34) it keeps the UV rays in close contact with the water to insure maximize bacteria kill, even in cloudy water.

It should be understood, of course, that the foregoing relates to exemplary embodiments of the invention and that modifications may be made without departing from the spirit and scope of the invention as set forth in the following claims.

What is claimed is:

1. A gravity flow runoff water purification system comprising:
   a debris filter operable to remove sediment and debris from water; and
   a linear electrolytic reactor fluidly connected to the debris filter, wherein the linear electrolytic reactor comprises:
      a plurality of cell chambers separated by at least one fixed electrode plate operable to receive a current;
      a bi-polar anode blend comprising a conductive and consumable metal fraction, a conductive and non-consumable fraction, and a non-conductive pours spacer, wherein the bi-polar anode blend is disposed within each of the plurality of cell chambers and is charged by the at least one electrode plate,
   wherein water is operable to run through the debris filter and into the linear electrolytic reactor, wherein the water flows through each of the cell chambers, thereby clarifying and purifying the water.

2. The gravity flow runoff water purification system of claim 1, wherein the debris filter is a rock bed filter and a grit chamber fluidly connected to the rock bed filter.

3. The gravity flow runoff water purification system of claim 1, further comprising a flow sensor configured to sense running water from the debris filter, wherein the flow sensor activates a power source electrically connected to the at least one fixed electrode plate.

4. The gravity flow runoff water purification system of claim 1, wherein the at least one fixed electrode plate comprises a plurality of fixed electrode plates each forming a barrier between the plurality of cell chambers.

5. The gravity flow runoff water purification system of claim 4, wherein each of the fixed electrode plates comprises at least one aperture near a top end facilitating the flow of water.

6. The gravity flow runoff water purification system of claim 5, wherein adjacent fixed electrode plates comprise apertures on opposite sides, thereby facilitating a serpentine flow of the water.

7. The gravity flow runoff water purification system of claim 6, further comprising a plurality of ultra violet emitting lights disposed in between the bi-polar anode blend and a top portion of the cell chamber.

8. The gravity flow runoff water purification system of claim 7, further comprising a rope comprising the plurality of ultra violet emitting lights, wherein the rope is secured to each fixed electrode plate adjacent to the at least one aperture.

9. The gravity flow runoff water purification system of claim 1, further comprising at least one ozone diffuser disposed beneath the bi-polar anode blend.

10. The gravity flow runoff water purification system of claim 1, wherein the current supplied to the at least one fixed electrode plate is a very low frequency AC current or a high frequency reversing DC current.

11. The gravity flow runoff water purification system of claim 1, further comprising an electrolytic dissolved air flotation separator comprising:
   a separating chamber;
   an electrolytic micro bubble generator disposed at a bottom of the separating chamber and operable to form a plurality of bubbles;
   a conveyor disposed over a top end of the separating chamber; and
   a baffle comprising a plurality of ports near the bottom end of the separating chamber;
   wherein the water comprising a plurality of floc runs from the a linear electrolytic reactor into the separating chamber, wherein the plurality of bubbles are attracted to and connect with the floc, guiding the floc towards the conveyor, wherein the conveyor is operable to remove the floc from the separating chamber and wherein the filtered water runs through the plurality of ports.

\* \* \* \* \*